May 7, 1940.     W. O. ROSE     2,199,714

STARTER DRIVE

Filed July 24, 1939

INVENTOR.
William O. Rose
BY Samuel Weisman
ATTORNEY.

Patented May 7, 1940

2,199,714

UNITED STATES PATENT OFFICE 2,199,714

STARTER DRIVE

William O. Rose, Wyandotte, Mich.

Application July 24, 1939, Serial No. 286,142

6 Claims. (Cl. 74—7)

The present invention pertains to a novel starter drive for automobile engines or the like, particularly the electrically operated mechanical starter for the internal combustion engine of a motor vehicle. The device is also useful in connection with stationary and other engines that must be turned over in starting.

The starter drive is of the type including a power driven sleeve or screw on which is rotatably threaded a gear which advances, when the screw is driven, into engagement with gear teeth on the flywheel of the motor to be started. The advance of the gear is limited by means of a stop embodied in the device. The impact of the gear against this stop causes considerable stress in the device, with the result that the latter is more liable to breakage and deterioration.

One of the objects of the invention is to provide a resilient or cushioned stop serving as a shock absorber for the gear. The above mentioned objections to a dead stop are thereby overcome.

The stop or shock absorber embodies a resilient material which in time is likely to become compressed and thereby alter the final position of the gear. In this connection, the invention includes a construction whereby such compression is compensated and the changed final position of the gear does not disturb its engagement with the flywheel gear.

Another object of the invention is to provide an improved means for retaining the gear against drifting under vibration away from its initial or idle position. The spring detent ordinarily used for this purpose is in the form of a pin which eventually wears a groove in one of the parts. According to the invention, the detent for this purpose consists of a spring blade anchored in the gear and bearing resiliently against the screw or sleeve with sufficient force to accomplish the purpose mentioned above and without mutilating any of the parts.

In a modification of the invention, the shock absorbing device functions as a clutch through which the gear is rotated. Due to this resilient or friction drive, there is less likelihood of breaking the corners of the gear teeth and flywheel gear teeth as they come into mesh with each other.

The invention is fully disclosed by way of example in the following description and in the accompanying drawing in which.

Reference to these views will now be made by use of like characters which are employed to designate corresponding parts throughout.

Figure 1:
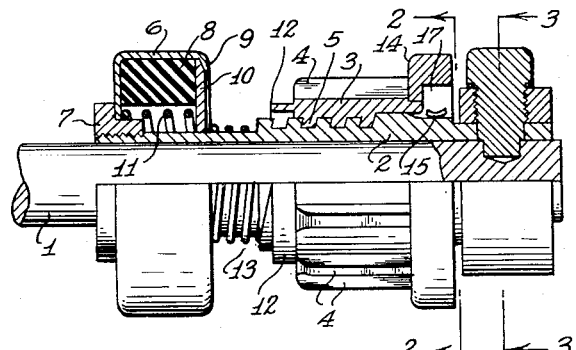
Figure 1 is a longitudinal section of the device.

Numeral 1 designates the starter drive shaft which is usually prolongation of the shaft of the electric starting motor. The shaft carries a threaded sleeve 2 on which is mounted a starter gear 3 having external spur teeth 4 and an internal thread 5 meshing with the thread of the sleeve 2. The sleeve is secured to the shaft 1 by means presently to be described. When the shaft and the sleeve are rotated by the starting motor, the gear 3 is advanced until its teeth 4 engage with gear teeth on the flywheel of the motor to be started, whereby continued rotation of the shaft and the gear 3 turns the motor over, in a manner well known in the art.

The forward end of the sleeve 2 carries the shock absorber assembly which comprises a cup 6 which may, for example, be secured on a nut 7 threaded on the free end of the sleeve. In the cup is mounted an annular cushion 8 of rubber, fiber or other suitable resilient material. The open end of the cup faces the gear 3 and is flanged inward at 9. Behind the flange is a disk or washer 10 which is backed by a coil spring 11 surrounding the portion of the sleeve 2 within the annular member 8 and also bearing against the bottom of the cup 6.

Thus, the spring retains the disk 10 normally against the flange 9, regardless of wear or compression of the cushion 8, and maintains the assembly tight while holding the spring 13 compressed.

The forward end of the starter gear 3 is formed with a projecting collar 12 which engages the disk 10 when the gear is advanced. Another coil spring 13 surrounds the sleeve 2 between the disk 10 and the forward end of the thread on the sleeve 2. This spring maintains the shock absorber against the shoulder of the nut 7.

Figure 2:
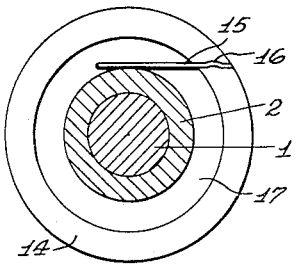
Figure 2 is a section on the line 2—2 of Figure 1.

The forward end of the gear 3 carries a flywheel 14 to increase its weight and provide faster and more uniform action. A leaf spring 15 is fixed in a slot 16 in the flywheel, extending through the cavity 17 of the wheel into tangential engagement with the sleeve 2, as shown in Figure 2. The engaging portion of the spring blade 15 is preferably convex against the sleeve to avoid binding and digging on the threads of sleeve 2 as the starter gear slides on the sleeve. The blade is of such width as to bridge adjacent convolutions of the thread and not fall therebetween.

To secure the sleeve 2 to the shaft 1, the sleeve has a lengthwise slot 18 cut therethrough near the rear end thereof, and in this slot is fitted a key 19 entering a notch 20 in the shaft. After alignment of the parts in this manner, a reinforcing collar 21 is slipped over the sleeve and key. A stud 22 (Figure 3) is screwed through the collar 21 and into openings 23 and 24 in the sleeve and shaft respectively.

In the operation of the device as thus far described, and as previously pointed out, the starter gear 3 is advanced towards the disk 10 on rotation of the shaft 1 and sleeve 2. The shock is absorbed in the cushion. The compression of the cushion, which may vary with use, does not exceed the length of the collar 12, so that the body of the gear 3 remains outside of the cup 6 where it is in a position to mesh properly with the flywheel gear of the motor. The advance is due to the inertia of the gear 3 and the flywheel 14 and the resulting failure of the gear to rotate at the same rate of speed as the sleeve. However, when stopped by the cushion, the gear 10 no longer shifts and must then turn bodily with the threaded sleeve to rotate the flywheel of the motor.

When the latter flywheel turns under its own power and at a speed exceeding that of the starter gear, this gear is thrown back on the sleeve to the extent permitted by the thread thereof. The several springs return to the normal position shown in Figure 1. Particularly, the blade spring 15 in frictional engagement with the sleeve prevents the starter gear from drifting under vibration.

Figures 3, 5:
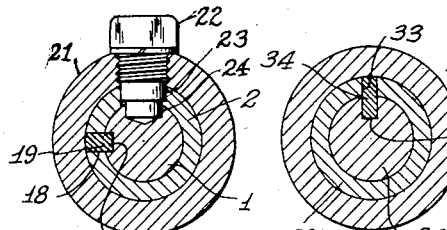
Figure 3 is a section on the line 3—3 of Figure 2.
Figure 5 is a section on the line 5—5 of Figure 1.
Figure 4:
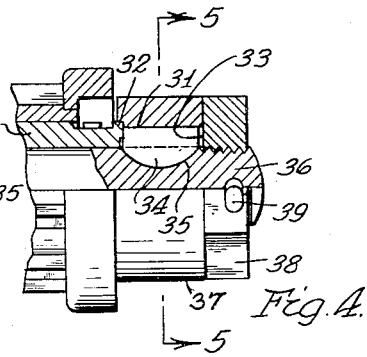
Figure 4 is a longitudinal section of a modification.

Figures 4 and 5 show a modification of the rear end assembly. The rear end of the sleeve 30 is slightly reduced in diameter at 31 to form a shoulder 32. The end is also slotted at 33 to receive the key 34 entering a notch 35 in the shaft 36. Over the reduced end is slipped a collar 37 which stops against the shoulder 32. The collar is backed by a nut 38 threaded on the end of the shaft and held by a pin 39.

Figure 6:
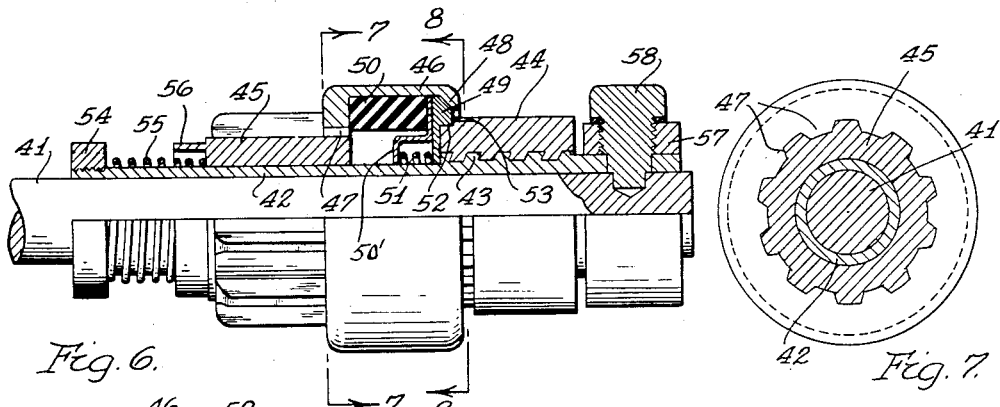
Figure 6 is a longitudinal section of another modification.
Figure 7:
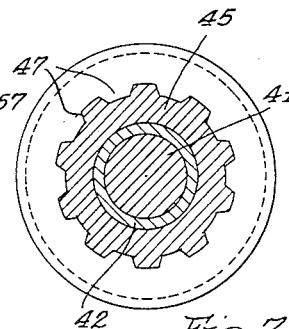
Figure 7 is a section on the line 7—7 of Figure 6.
Figure 8:
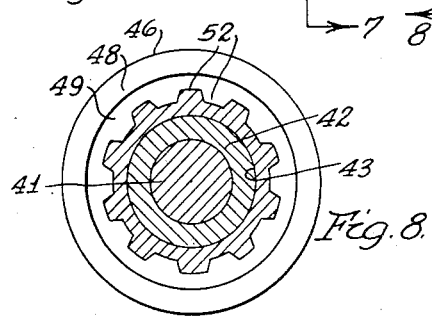
Figure 8 is a section on the line 8—8 of Figure 6.

The modification shown in Figures 6, 7, and 8, utilizes the shock absorber as an indirect drive or clutch transmitting motion to the starter gear. As in the previous construction, this device embodies a drive shaft 41 on which is mounted a sleeve 42 having a thread 43 on a comparatively small portion of its length, and at the rear end thereof. On this thread is mounted a nut 44.

Forward of the nut and thread and spaced therefrom is a starter gear 45 rotatably mounted on the sleeve 42. In the space between the members 44 and 45 is a cup 46 splined at 47 on the rear end of the gear 45 and having an inward flange 48 at its forward end. Behind this flange is a disk 49 extending into engagement with the forward end of the nut 44. An annular cushioning member 50 lies between the disk 49 and the forward end of the cup and clamps a spring retaining seat 50' against the disk 49. Within the member 50' is a coil spring 51 bearing against the flange 49 and the bottom of the retaining seat. The disk is splined at 52 on the forward end of the nut 44 and is also engaged by a shoulder 53 on the nut.

On the forward end of the sleeve 42 is screwed a nut 54 between which and the forward end of the gear 45 is a coil spring 55 to hold the parts in assembly. The forward end of the starter gear is also preferably formed with a projecting collar 56 to accommodate the spring 55 when the starter gear has been thrown forward.

The rear ends of the shaft 41 and the sleeve 42 are keyed together as previously set forth and enclosed in a collar 57 secured to the shaft sleeve by a stud 58 inserted therein.

In the operation of this device, rotation of the sleeve 42 by the shaft 41 advances the nut 44 on the thread 43 and causes compression of the member 50 and spring 51. The member 50 then becomes operative as a friction clutch driving the cup 46 and gear 45 in rotation and forwardly by the abutting of the cup 46 against the ends of the gear teeth. The forward thrust of the starter gear is cushioned by the coil spring 55 and, in addition, the reaction is absorbed in the member 50.

After the return throw of the gear 45 and associated parts, the springs 55 and 51 maintain the assembly against rattling. Also, the spring 51, bearing directly against the disk 49 and nut 44, holds the latter against drifting under vibration.

Although specific embodiments of the invention have been illustrated and described, it will be understood that various alterations in the details of construction may be made without departing from the scope of the invention, as indicated by the appended claims.

What I claim is:

1. In a starter drive of the class described, a starter drive shaft, an externally threaded sleeve secured thereon, a starter gear threaded on said sleeve, a cup on the forward end of said sleeve and having an opening facing said gear, a flange extending from said cup into said opening, a loose disk in said opening and behind said flange, resilient material in said cup and behind said disk, and a spring behind said disk and holding said disk against said flange.

2. In a starter drive of the class described, a starter drive shaft, an externally threaded sleeve secured thereon, a starter gear threaded on said sleeve, a cup on the forward end of said sleeve and having an opening facing said gear, a flange extending from said cup into said opening, a loose disk in said opening and behind said flange, resilient material in said cup and behind said disk, a forwardly extending collar on the forward end of said gear and adapted to engage said disk, a spring behind said disk and holding said disk against said flange, and another spring between said disk and the threads of said sleeve and adapted to be disposed partially within said collar.

3. In a starter drive of the class described, a starter drive shaft, an externally threaded sleeve secured thereon, a starter gear threaded on said sleeve, a cup on the forward end of said sleeve and having an opening facing said gear, a flange extending from said cup into said opening, a loose disk in said opening and behind said flange, resilient material in said cup and behind said disk, a spring behind said disk and holding said disk against said flange, and another spring between said disk and the threads of said sleeve.

4. In a starter drive of the class described, a starter drive shaft, an externally threaded sleeve secured thereon, a starter gear threaded on said sleeve, a cup on the forward end of said sleeve and having an opening facing said gear, a flange extending from said cup into said opening, a loose disk in said opening and behind said flange, a rubber cushion in said cup and behind said disk, and a spring behind said disk and holding said disk against said flange.

5. In a starter drive of the class described, a starter drive shaft, an externally threaded sleeve secured thereon, a starter gear threaded on said sleeve, a cup on the forward end of said sleeve and having an opening facing said gear, a flange extending from said cup into said opening, a loose disk in said opening and behind said flange, a rubber cushion in said cup and behind said disk, a forwardly extending collar on the forward end of said gear and adapted to engage said disk, a spring behind said disk and holding said disk against said flange, and another spring between said disk and the threads of said sleeve.

6. In a starter drive of the class described, a starter drive shaft, an externally threaded sleeve secured thereon, a starter gear threaded on said sleeve, a cup on the forward end of said sleeve and having an opening facing said gear, a flange extending from said cup into said opening, a loose disk in said opening and behind said flange, a rubber cushion in said cup and behind said disk, a spring behind said disk and holding said disk against said flange, and another spring between said disk and the threads of said sleeve.

WILLIAM O. ROSE.